United States Patent
Michalewich et al.

(10) Patent No.: US 10,252,112 B2
(45) Date of Patent: Apr. 9, 2019

(54) GOLF BALL COMPOSITION

(71) Applicant: Acushnet Company, Fairhaven, MA (US)

(72) Inventors: Michael Michalewich, Norton, MA (US); Brian Comeau, Berkley, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/463,157

(22) Filed: Mar. 20, 2017

(65) Prior Publication Data

US 2018/0264324 A1    Sep. 20, 2018

(51) Int. Cl.
| | | |
|---|---|---|
| A63B 37/12 | (2006.01) | |
| A63B 37/00 | (2006.01) | |
| C08G 18/38 | (2006.01) | |
| C09D 175/04 | (2006.01) | |
| C09D 5/32 | (2006.01) | |
| C09D 7/61 | (2018.01) | |
| C08G 18/10 | (2006.01) | |

(52) U.S. Cl.
CPC ...... *A63B 37/0022* (2013.01); *A63B 37/0024* (2013.01); *A63B 37/0074* (2013.01); *C08G 18/10* (2013.01); *C08G 18/3851* (2013.01); *C09D 5/32* (2013.01); *C09D 7/61* (2018.01); *C09D 175/04* (2013.01)

(58) Field of Classification Search
None
See application file for complete search history.

(56) References Cited

U.S. PATENT DOCUMENTS

| | | | |
|---|---|---|---|
| 3,213,058 A * | 10/1965 | Boyle | C07D 249/20 525/7 |
| 4,845,180 A * | 7/1989 | Henry | C08G 18/285 524/91 |
| 6,019,921 A * | 2/2000 | Lutz | A63B 37/0003 264/129 |
| 6,083,119 A | 7/2000 | Sullivan et al. | |
| 6,307,055 B1 * | 10/2001 | Thanki | C07D 249/20 548/259 |
| 6,395,861 B1 | 5/2002 | Kennedy, III | |
| 6,506,851 B2 | 1/2003 | Wu | |
| 6,518,358 B1 * | 2/2003 | Wu | A63B 37/0003 473/354 |
| 6,528,578 B2 | 3/2003 | Wu | |
| 6,610,812 B1 | 8/2003 | Wu et al. | |
| 6,939,939 B2 | 9/2005 | Slagel et al. | |
| 7,148,278 B2 | 12/2006 | Bulpett et al. | |
| 7,261,535 B2 | 8/2007 | Puniello | |
| 7,262,235 B2 | 8/2007 | Bulpett | |
| 7,410,429 B1 | 8/2008 | Bulpett et al. | |
| 7,537,530 B2 | 5/2009 | Bulpett et al. | |
| 7,648,428 B2 | 1/2010 | Nagasawa | |
| 7,678,877 B2 | 3/2010 | Yang et al. | |
| 7,705,075 B2 | 4/2010 | Kumar et al. | |
| 7,705,176 B2 | 4/2010 | Cholli et al. | |
| 7,705,185 B2 | 4/2010 | Kumar et al. | |
| 7,722,483 B2 | 5/2010 | Morgan | |
| 7,767,853 B2 | 8/2010 | Cholli et al. | |
| 7,799,948 B2 | 9/2010 | Kumar et al. | |
| 7,902,317 B2 | 3/2011 | Kumar et al. | |
| 7,923,587 B2 | 4/2011 | Cholli | |
| 7,956,153 B2 | 6/2011 | Cholli et al. | |
| 8,008,423 B2 | 8/2011 | Kumar et al. | |
| 8,039,673 B2 | 10/2011 | Cholli et al. | |
| 8,080,689 B2 | 12/2011 | Kumar et al. | |
| 8,242,230 B2 | 8/2012 | Cholli et al. | |
| 8,252,884 B2 | 8/2012 | Kumar et al. | |
| 8,481,670 B2 | 7/2013 | Kumar et al. | |
| 8,529,376 B2 | 9/2013 | Morgan | |
| 8,551,279 B2 | 10/2013 | Johnson et al. | |
| 8,598,382 B2 | 12/2013 | Cholli et al. | |
| 8,691,933 B2 | 4/2014 | Kumar et al. | |
| 8,710,266 B2 | 4/2014 | Kumar et al. | |
| 8,758,168 B2 | 6/2014 | Morgan | |
| 8,846,847 B2 | 9/2014 | Cholli et al. | |
| 8,927,472 B2 | 1/2015 | Cholli et al. | |
| 8,956,730 B2 | 2/2015 | Uprety et al. | |
| 8,979,669 B2 | 3/2015 | Greaney et al. | |
| 9,193,675 B2 | 11/2015 | Cholli et al. | |
| 9,227,109 B2 | 1/2016 | Michalewich | |
| 9,388,120 B2 | 7/2016 | Kumar | |
| 2008/0071016 A1 | 3/2008 | Boettcher et al. | |
| 2009/0062037 A1 * | 3/2009 | Ohama | A63B 37/0003 473/378 |

(Continued)

FOREIGN PATENT DOCUMENTS

| | | |
|---|---|---|
| DE | 3725926 | 2/1989 |
| DE | 4406024 | 8/1995 |
| EP | 31302 | 7/1981 |
| EP | 434618 | 6/1991 |
| EP | 707002 | 4/1996 |
| GB | 2319035 | 5/1998 |
| GB | 2361005 | 10/2001 |

OTHER PUBLICATIONS

U.S. Appl. No. 13/534,264, to Michaelwich, et al., filed Jun. 27, 2012.

*Primary Examiner* — David J Buttner
(74) *Attorney, Agent, or Firm* — Mandi B. Milbank

(57) ABSTRACT

Disclosed herein are polyurethane/urea golf ball compositions. The compositions comprise the reaction product of a polyisocyanate prepolymer, a reactive ultraviolet light absorber, and a chain extender. Suitable reactive ultraviolet light absorbers contain at least one reactive functional end group.

15 Claims, No Drawings

(56) References Cited

U.S. PATENT DOCUMENTS

2012/0100935 A1     4/2012   Michalewich et al.
2012/0286449 A1    11/2012   Michalewich et al.

* cited by examiner

GOLF BALL COMPOSITION

FIELD OF THE INVENTION

The present invention relates generally to polyurethane/urea compositions comprising a reactive ultraviolet light absorber, and to the use thereof in golf ball compositions. The ultraviolet light absorber has a hydrocarbon tail which contains at least one reactive functional end group.

BACKGROUND OF THE INVENTION

Ultraviolet light (UV) absorbers are commonly used in golf ball cover and coating compositions to protect the product from discoloration and degradation. However, conventional UV absorbers typically have a relatively low molecular weight and can have limited solubility in the final composition. As a result, these UV absorbers tend to migrate to the surface of the layer over time. This migration may provide greater protection at the surface, but can cause interlayer adhesion problems. Migration also has an undesirable effect of introducing bloomed material into the environment.

UV absorbers with reduced migration and surface bloom for use in golf ball compositions have been previously disclosed. For example, U.S. Patent Application Publication No. 2016/0059083 to Michalewich, the entire disclosure of which is hereby incorporated herein by reference, discloses a polyurethane golf ball composition comprising a reaction product of a prepolymer and a curing agent, wherein the prepolymer is a reaction product of a polyol mixture and a diisocyanate, and wherein the polyol mixture comprises 2-(2H-benzotriazol-2-yl)-4-(1,1,3,3-tetramethylbutyl)phenol.

However, there continues to be a need for a polyurethane/urea composition containing a UV absorber with further reduced migration and surface bloom.

SUMMARY OF THE INVENTION

The present invention is directed to a golf ball having at least one layer formed from a polyurethane/urea composition, wherein the composition comprises a reaction product of a polyisocyanate prepolymer, a reactive benzotriazole ultraviolet light absorber, and a chain extender. The reactive benzotriazole ultraviolet light absorber has the following structure:

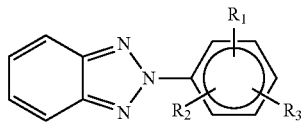

herein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; and $R_3$ is a hydrocarbon moiety having at least one reactive functional end group selected from hydroxyls, amines, thiols, vinyl, and epoxides. The layer formed from the polyurethane/urea composition is preferably an outer cover layer and/or a coating layer.

DETAILED DESCRIPTION

By the present invention, it has been discovered that reduced migration and surface bloom of a UV absorber in a polyurethane/urea composition can be achieved by selecting a UV absorber having at least one functional end group that is reactive with the isocyanate groups of the prepolymer, binding the UV absorber in place and becoming part of the polymer when the prepolymer is reacted with a chain extender. These reactive UV absorbers are preferably selected from benzotriazoles, benzophenones, triazines, benzoxazinones, benzoates, formamidines, cinnamates/propenoates, aromatic propanediones, benzimidazoles, cycloaliphatic ketones, formanilides, cyanoacrylates, benzopyranones, salicylates, and substituted acrylonitriles, having at least one reactive functional end group on a hydrocarbon tail thereof. Suitable reactive functional groups include, but are not limited to, hydroxyls, amines, thiols, vinyls, and epoxides, and combinations thereof.

In a particular embodiment, the reactive UV absorber is selected from benzotriazoles having the structure:

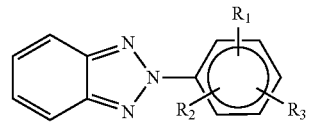

wherein $R_1$ is OH; $R_2$ is selected from alkyl, hydroxyalkyl, acryloxyalkyl, (hydroxyphenyl)alkyl, (alkylester)alkyl, (hydroxyalkylether)oxoalkyl, and phenylalkyl; and $R_3$ is a hydrocarbon moiety having at least one reactive functional group selected from hydroxyls, amines, thiols, vinyl, and epoxides. In a particular aspect of this embodiment, $R_3$ is a hydrocarbon moiety having at least two reactive functional group selected from hydroxyls, amines, thiols, vinyl, and epoxides. In a further particular aspect of this embodiment, $R_3$ is a hydrocarbon moiety of having two hydroxyl end groups.

In a further particular embodiment, the reactive benzotriazole UV absorber has the following structure:

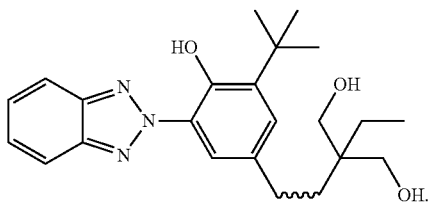 [SMILES: CCC(CO)(CO)CCc1cc(-n2nc3ccccc3n2)c(O)c(C(C)(C)C)c1]

The reactive UV absorber is present in an amount such that the final polyurethane/urea composition comprises 0.5 wt % or 1.0 wt % or 1.5 wt % or 3.0 wt % or 4.5 wt % or 5.0 wt % or 7.0 wt % of the reactive UV absorber, based on the total weight of the polyurethane/urea composition, or the final polyurethane/urea composition comprises the reactive UV absorber in an amount having a lower limit and an upper limit selected from these values.

Polyisocyanate Prepolymer

Polyurethane/urea-based golf ball compositions of the present invention comprise the reaction product of a polyisocyanate prepolymer and a chain extender. The polyisocyanate prepolymer is selected from polyurethane prepolymers and polyurea prepolymers. Polyurethane prepolymers are the reaction product of a polyol with an excess amount of an isocyanate. Polyurea prepolymers are the reaction product of an amine-terminated compound with an excess amount of an isocyanate.

Suitable isocyanates for forming the polyisocyanate prepolymer include aliphatic, cycloaliphatic, aromatic aliphatic, derivatives thereof, and combinations of two or more thereof having two or more isocyanate (NCO) groups per molecule. The isocyanates may be organic, modified organic, organic polyisocyanate-terminated prepolymers, or a combination thereof. The isocyanate may be any isocyanate-functional monomer, dimer, trimer, or multimeric adduct thereof, prepolymer, quasi-prepolymer, or combination of two or more thereof. Suitable isocyanate-functional compounds also include any monoisocyanate or polyisocyanate that includes any isocyanate functionality of two or more.

Suitable diisocyanates include those having the general formula NCO—R—NCO, where R is preferably a cyclic or linear or branched hydrocarbon moiety containing from 1 to 20 carbon atoms. When multiple cyclic groups are present, linear and/or branched hydrocarbons containing from 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or combinations thereof.

Non-limiting examples of particularly suitable unsaturated isocyanates, i.e., aromatic compounds, include 2,2'-, 2,4'-, and 4,4'-diphenylmethane diisocyanate (MDI); 3,3'-dimethyl-4,4'-biphenyl diisocyanate (TODI); toluene diisocyanate (TDI); polymeric MDI; carbodimide-modified liquid 4,4'-diphenylmethane diisocyanate; para-phenylene diisocyanate (PPDI); meta-phenylene diisocyanate (MPDI); triphenylmethane-4,4'-, and triphenylmethane-4,4"-triisocyanate; napthylene-1,5,-diisocyanate; 2,4'-, 4,4'-, and 2,2'-biphenyl diisocyanate; polyphenylene polymethylene polyisocyanate (PMDI) (also known as polymeric PMDI); and combinations of two or more thereof.

Non-limiting examples of particularly suitable saturated isocyanates include ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and combinations thereof; modified polyisocyanate derived from the above isocyanates and polyisocyanates; and combinations of two or more thereof.

In a particular embodiment, the isocyanate is MDI.

In embodiments wherein the polyisocyanate prepolymer is a polyurethane prepolymer, suitable polyols for forming the prepolymer include, but are not limited to, polyether polyols, polycaprolactone polyols, polyester polyols, polycarbonate polyols, and hydrocarbon polyols. The hydrocarbon chain of the polyol can have saturated or unsaturated bonds, or substituted or unsubstituted aromatic and cyclic groups.

Suitable polyether polyols include, but are not limited to, polytetramethylene ether glycol (PTMEG); copolymers of polytetramethylene ether glycol and 2-methyl-1,4-butane diol (PTG-L); poly(oxyethylene) glycol; poly(oxypropylene) glycol; ethylene oxide capped (polyoxypropylene) glycol; poly(oxypropylene oxyethylene) glycol; and combinations of two or more thereof.

Suitable polycaprolactone polyols include, but are not limited to, diethylene glycol initiated polycaprolactone; propylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; polytetramethylene ether glycol initiated polycaprolactone; ethylene glycol initiated polycaprolactone; dipropylene glycol initiated polycaprolactone; and combinations of two or more thereof.

Suitable polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; o-phthalate-1,6-hexanediol polyester polyol; polyethylene terephthalate polyester polyols; and combinations of two or more thereof.

Suitable polycarbonate polyols include, but are not limited to, poly(phthalate carbonate) glycol, poly(hexamethylene carbonate) glycol, polycarbonate polyols containing bisphenol A, and combinations of two or more thereof.

Suitable hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and combinations of two or more thereof.

Other polyols that may be used to form the prepolymer include, but are not limited to, glycerols; castor oil and its derivatives; Polytail™ H and Polytail™ HA polyhydroxy polyolefin oligomers, commercially available from Mitsubishi Chemical; acrylic polyols; acid functionalized polyols based on a carboxylic, sulfonic, or phosphoric acid group; dimer alcohols converted from the saturated dimerized fatty acid; and combinations of two or more thereof.

By using polyols based on a hydrophobic backbone, the polyurethane composition may be more water resistant than those using polyols without a hydrophobic backbone. Non-limiting examples of suitable polyols based on a hydrophobic backbone include hydrocarbon polyols, hydroxy-terminated polybutadiene polyols, polyethers, polycaprolactones, and polyesters.

In a particular embodiment, the polyol used to form the polyurethane prepolymer is PTMEG.

In embodiments wherein the polyisocyanate prepolymer is a polyurea prepolymer, suitable amine-terminated compounds for forming the prepolymer include amine-terminated hydrocarbons, amine-terminated polyethers, amine-terminated polyesters, amine-terminated polycarbonates, amine-terminated polycaprolactones, and combinations of two or more thereof. The molecular weight of the amine compound is generally in the range of about 100 to about 10,000. Suitable polyether amines include, but are not limited to, methyldiethanolamine; polyoxyalkylenediamines, such as polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; glycerin-based triamines; and combinations of two or more thereof. Suitable additional amine-terminated compounds for forming the prepolymer include, but are not limited to, poly(acrylonitrile-co-butadiene); poly(1,4-butanediol) bis(4-aminobenzoate) in liquid or waxy solid form; linear and branched polyethylene imine; low and high molecular weight polyethylene imine having an average molecular weight of about 500 to about 30,000; poly(propylene glycol) bis(2-aminopropyl ether) having an average molecular weight of about 200 to about 5,000; polytetrahydrofuran bis (3-aminopropyl) terminated having an average molecular weight of about 200 to about 2000; and combinations of two or more thereof.

In a particular embodiment, the amine-terminated compound used to form the polyurea prepolymer is a polyether amine, such as JEFF AMINE® D2000 polyoxypropylenediamine, commercially available from Huntsman Corporation. In another particular embodiment, the amine-terminated compound used to form the polyurea prepolymer is a copolymer of polytetramethylene oxide and polypropylene oxide, such as that commercially available from Huntsman Corporation.

Chain Extender

The polyisocyanate prepolymer is reacted with a chain extender. The chain extender may consist of a single chain extender or comprise a combination of two or more chain extenders, and optionally includes a freezing point depressing agent. Suitable chain extenders include, but are not limited to, hydroxy-terminated chain extenders, amine-terminated chain extenders, and combinations thereof. The chain extender may be saturated or unsaturated.

Non-limiting examples of suitable chain extenders include 1,4-butanediol; 1,3-butanediol; 1,2-butanediol; 2,3-butanediol; 2,3-dimethyl-2,3-butanediol; propylene glycol, dipropylene glycol; polypropylene glycol; 2-methyl-1,3-propanediol; 2-methyl-1,4-butanediol; ethylene glycol; diethylene glycol; polyethylene glycol; resorcinol-di(beta-hydroxyethyl)ether and its derivatives; hydroquinone-di(beta-hydroxyethyl)ether and derivatives thereof; 2-propanol-1,1'-phenylaminobis; trimethylolpropane; 4,4'-methylenebis(2-chloroaniline); 3,5-dimethylthio-2,4-toluenediamine; 3,5-dimethylthio-2,6-toluenediamine; 4,4'-methylenebis(2-ethylaniline); 4,4'-bis-(sec-butylamino)-diphenylmethane; 1,3-bis-(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-bis-(sec-butylamino) benzene; 1,2-bis-(sec-butylamino)benzene; 3,5-diethyltoluene-2,4-diamine; 3,5-diethyltoluene-2,6-diamine; tetra-(2-hydroxypropyl)-ethylenediamine; N,N'-dialkyldiamino diphenyl methane; trimethyleneglycol-di-p-aminobenzoate; polytetramethyleneoxide-di-p-aminobenzoate; 4,4'-methylene bis-(3-chloro-2,6-diethylaniline); 1,4-cyclohexyldimethylol; 2-methylpentamethylene diamine; isomers and mixtures of diaminocyclohexane; isomers and mixtures of cyclohexane bis(methylamine); polytetramethylene ether glycol; isomers and mixtures of cyclohexyldimethylol; triisopropanolamine; diethylene triamine; triethylene tetramine; tetraethylene pentamine; propylene diamine; dipropylene triamine; 1,3-diaminopropane; dimethylamino propylamine; diethylamino propylamine; diethylene glycol bis-(aminopropyl) ether; imido-bis-(propylamine); monoethanolamine; diethanolamine; triethanolamine; monoisopropanolamine; diisopropanolamine; isophoronediamine; N,N'-diisopropyl-isophoronediamine; polyoxypropylene diamine; propylene oxide-based triamine; 3,3'-dimethyl-4,4'-diaminocyclohexylmethane; 1,5-pentanediol; 1,6-hexanediol; glycerol; 1,3-bis-(2-hydroxyethoxy)cyclohexane; 1,3-bis-[2-(2-hydroxyethoxy)ethoxy]cyclohexane; 1,3-bis-{2-[2-(2-hydroxyethoxy)ethoxy]ethoxy}cyclohexane; N,N,N',N'-tetra-(2-hydroxypropyl-ethylene) diamine; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; and combinations thereof.

In a particular embodiment, the chain extender is a dimethylthiotoluenediamine, e.g., Ethacure® 300 curative comprising dimethylthiotoluenediamine with a minor amount of monomethylthiotoluenediamine, commercially available from Albemarle Corporation.

The chain extender optionally comprises a freezing point depressing agent so that the freezing point of the blend is less than its normal freezing point temperature. The freezing point depressing agent is preferably compatible with the chain extender. For example, hydroxy-terminated chain extenders, such as 1,4-butanediol, may be modified with a hydroxy-terminated freezing point depressing agent or a mixture of hydroxy-terminated freezing point depression agents. Examples of hydroxy-terminated freezing point depressing agents include, but are not limited to, 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, dipropylene glycol, and combinations thereof. Similarly, amine-terminated chain extenders, such as hexamethylene diamine, may be modified with an amine-terminated freezing point depressing agent or a mixture of amine-terminated freezing point depressing agents. Examples of amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and combinations thereof. The freezing point depressing agent is preferably added in an amount sufficient to reduce the freezing point of the chain extender by a suitable amount to prevent loss of pigment dispersion, but not affect the physical properties of the golf ball. Freezing point depressing agents are further disclosed, for example, in U.S. Pat. No. 7,888,449 to Wu, the entire disclosure of which is hereby incorporated herein by reference.

As discussed above, the polyisocyanate prepolymer used to form the polyurethane/urea composition is selected from polyurethane prepolymers and polyurea prepolymers, and the chain extender is selected from polyols and amine-terminated compounds. Thus, for purposes of the present disclosure, the term polyurethane/urea includes polyurethane, polyurea, and polyurethane-urea hybrid compositions.

Suitable isocyanates, polyols, amine-terminated compounds, and chain extenders are further disclosed, for example, in U.S. Pat. No. 8,674,051 to Wu et al.; U.S. Pat. No. 9,295,881 to Michalewich et al.; U.S. Pat. No. 6,528,578 to Wu; U.S. Pat. No. 6,506,851 to Wu; U.S. Pat. No. 7,148,278 to Bulpett et al.; and U.S. Patent Application Publication No. 2012/0286449 to Michalewich et al.; the entire disclosures of which are hereby incorporated herein by reference.

Catalyst

A catalyst is optionally employed to promote the reaction between the polyol or amine-terminated compond and the isocyanate, and/or the reaction between the prepolymer and the chain extender. Suitable catalysts include, but are not limited to bismuth catalysts; zinc octoate; stannous octoate; tin catalysts, e.g., bis-butyltin dilaurate, bis-butyltin diacetate, stannous octoate, tin (II) chloride, tin (IV) chloride, bis-butyltin dimethoxide, dimethyl-bis[1-oxonedecyl)oxy] stannane, and di-n-octyltin bis-isooctyl mercaptoacetate; amine catalysts, e.g., triethylenediamine, triethylamine, and tributylamine; organic acids, e.g., oleic acid and acetic acid; delayed catalysts, e.g., Polycat® catalysts, commercially available from Air Products and Chemicals, Inc.; and combinations thereof. A catalyst is optionally employed to promote the reaction between the polyol or amine-terminated compound and the isocyanate.

Additives and Fillers

Additional materials conventionally included in the polyurethane/urea composition may be added to the prepolymer, the chain extender, or the resulting polyurethane/urea composition. These additional materials include, but are not limited to, wetting agents, coloring agents, optical brighteners, crosslinking agents, whitening agents (e.g., $TiO_2$ and ZnO), conventional UV absorbers (e.g., titanium dioxide, zinc oxide, barium sulfate, violet, Paliogen® Blue L 6385 indanthrone blue pigment, ultra marine blue, etc.), hindered amine light stabilizers, defoaming agents, processing aids, surfactants, and other conventional additives. Antioxidants, stabilizers, softening agents, plasticizers (including internal and external plasticizers), impact modifiers, foaming agents, density-adjusting fillers, reinforcing materials, and compatibilizers may also be added to the composition.

Fillers may be added to the polyurethane/urea composition to affect rheological and mixing properties, the specific gravity (i.e., density-modifying fillers), the modulus, the tear strength, reinforcement, and the like. The fillers are generally inorganic, and typically include numerous metals, metal oxides and salts, e.g., zinc oxide, tin oxide, calcium oxide, barium sulfate, zinc sulfate, calcium carbonate, zinc carbonate, barium carbonate, clay, tungsten, tungsten carbide, silica, regrind (recycled core material typically ground to about 30 mesh particle), high-Mooney-viscosity rubber regrind, and combinations thereof.

Golf Ball Construction

Polyurethane/urea compositions of the present invention are not limited by the use of the composition in a particular golf ball construction, and can be used to form a cover and/or coating layer in a variety of golf ball constructions. For example, the compositions are suitable for use in two-piece, multi-layer, and wound golf balls, having a variety of core structures, intermediate layers, covers, and coatings.

Core Materials

Cores of golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material.

Particularly suitable core materials include, but are not limited to, thermosetting materials, such as styrene butadiene, polybutadiene, isoprene, polyisoprene, and trans-isoprene; thermoplastics, such as ionomer resins, polyamides and polyesters; and thermoplastic and thermosetting polyurethane and polyureas. Particularly preferred core compositions are thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-b enzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Cover Materials

In a particular embodiment, golf balls formed according to the invention include one or more cover layers, particularly an outer cover layer, formed from a polyurethane/urea composition of the present invention.

Golf balls formed according to the invention optionally include one or more cover layers formed from a suitable material other than a polyurethane/urea composition of the present invention. Suitable cover materials are selected from conventional polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; non-ionomeric acid copolymers, e.g., ethylene (meth)acrylic acid; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether and polyester amides, commercially available from Arkema Inc; crosslinked trans-polyisoprene and blends thereof polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. A particularly preferred inner cover layer material is an ionomer composition comprising a blend of Surlyn® 7940/Surlyn® 8940, optionally including a melt flow modifier.

Suitable conventional polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. patent application Ser. No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover comprises an inner cover layer formed from an ionomer composition and an outer cover layer formed from a polyurethane/urea composition of the present invention.
Coating In a particular embodiment, golf balls formed according to the invention include one or more coating layers formed from a polyurethane/urea composition of the present invention.

Golf balls are typically finished by applying one or more finishing coats over the cover. For example, a primer and a topcoat may be applied. Either or both of the primer and topcoat compositions may be pigmented or clear. Several coats of clear or pigmented coatings may be applied.

Primer compositions are typically a solvent-borne or water-borne material, particularly selected from, but not limited to, polyurethanes, polyureas, acrylic polyurethanes, polyesters, polyester acrylics, and epoxies. In a particular embodiment, the primer composition is a two-part solvent-borne polyurethane comprising a resin component and an isocyanate component. In a particular aspect of this embodiment, the isocyanate component is present in an amount of from 31 parts to 35 parts, by weight per 100 parts of the resin component. In another particular aspect of this embodiment, the resin component comprises from 50 to 58 wt % solids and the isocyanate component comprises from 46 to 53 wt % solids. In another particular aspect of this embodiment, the resin component is SPU69723D from PPG Industries and the isocyanate component is GXH69725 from PPG Industries.

Topcoat compositions are typically a solvent-borne material particularly selected from, but not limited to, polyurethanes, polyureas, acrylic polyurethanes, polyesters, polyester acrylics, and epoxies. In a particular embodiment, the topcoat composition is a two-part solvent-borne polyurethane comprising a resin component and an isocyanate component. In a particular aspect of this embodiment, the isocyanate component is present in an amount of from 68 parts to 71 parts, by weight per 100 parts of the resin component. In another particular aspect of this embodiment, the resin component comprises from 46 to 52 wt % solids and the isocyanate component comprises from 46 to 53 wt % solids. In another particular aspect of this embodiment, the resin component is SPU61369K from PPG Industries and the isocyanate component is GXH69725 from PPG Industries.

Primer and topcoat compositions optionally include additives including, but not limited to, pigments, tints, dyes, fillers, reaction enhancers or catalysts, crosslinking agents, optical brighteners, propylene carbonates, such as those disclosed in U.S. Pat. No. 5,840,788, which is incorporated in its entirety by reference herein, coloring agents, fluorescent agents, whitening agents, UV absorbers, hindered amine light stabilizers, defoaming agents, processing aids, mica, talc, nano-fillers, wetting agents, solvents, and other conventional additives.

Non-limiting examples of suitable coatings are further disclosed, for example, in U.S. Pat. Nos. 5,409,233; 5,459,220; 5,494,291; 5,820,491; 5,669,831; 5,817,735; and 7,935,421, the entire disclosure of which are hereby incorporated herein by reference In a particular embodiment, golf balls of the present invention comprise at least one coat of primer and at least one coat of topcoat. In a particular aspect of this embodiment, the primer is a solvent-borne composition and the topcoat is a solvent-borne composition. In a further particular aspect of this embodiment, at least one coat of primer and/or at least one coat of topcoat comprise a polyurethane/urea composition of the present invention.
Component Dimensions Dimensions of golf ball components, i.e., thickness and diameter, may vary depending on the desired properties.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches.

In a particular embodiment, the core is a solid, single layer having a diameter within a range having a lower limit of 0.750 or 1.00 or 1.10 or 1.15 or 1.20 or 1.25 or 1.30 or 1.40 or 1.50 or 1.53 or 1.55 inches and an upper limit of 1.55 or 1.60 or 1.62 or 1.63 or 1.65 inches. In a particular aspect of this embodiment, the core has a center Shore C hardness of 95 or less, or 90 or less, or 85 or less, or 80 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the core has an outer surface Shore C hardness of 50 or greater, or 55 or greater, or 60 or greater, or 65 or greater, or 70 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the core has a low negative, low positive, or zero hardness gradient. In another particular aspect of this embodiment, the core is formed from a substantially homogeneous formulation and has a hardness gradient wherein the difference between the Shore C hardness of the outer surface and the Shore C hardness of the center of the core is within a range having a lower limit of −8 or −5 or −3 or 0 and an upper limit of 0 or 3 or 5 or 8.

In another particular aspect of this embodiment, the core has a compression of 90 or less, or 80 or less, or 75 or less, or 70 or less, or a compression within a range having a lower limit of 50 or 55 or 60 or 65 and an upper limit of 65 or 70 or 75 or 80 or 90.

In another particular embodiment, the core comprises an inner core layer and an outer core layer, the inner core layer having a diameter within a range having a lower limit of 0.900 or 0.910 or 0.920 or 0.930 or 0.940 or 0.950 or 0.960 or 0.970 or 0.980 or 0.990 or 1.000 or 1.010 or 1.020 inches and an upper limit of 1.020 or 1.030 or 1.040 or 1.050 or 1.060 or 1.070 or 1.080 or 1.090 or 1.100 or 0.110 or 1.120 or 1.130 inches, and the outer core having a thickness within the range having a lower limit of 0.050 or 0.100 or 0.200 or 0.250 inches and an upper limit of 0.280 or 0.310 or 0.440 or 0.500 inches. In a particular aspect of this embodiment, the inner core layer has a center Shore C hardness of 95 or less, or 90 or less, or 85 or less, or 80 or less, or 75 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the inner core layer has an outer surface Shore C hardness of 50 or greater, or 55 or greater, or 60 or greater, or 65 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the inner core layer has a negative or zero hardness gradient. In another particular aspect of this embodiment, the inner core layer is formed from a substantially homogeneous formulation and the difference between the Shore C hardness of the outer surface of the inner core layer and the Shore C hardness of the center of the inner core layer is within a range having a lower limit of −20 or −15 or −10 and an upper limit of −10 or −5 or 0. In another particular aspect of this embodiment, the inner core layer has a compression of 50 or less, or 40 or less, or 30 or less, or a compression within a range having a lower limit of 10 or 15 or 20 or 25 and an upper limit of 25 or 30 or 40 or 50 or 65. In another particular aspect of this embodiment, the outer core layer has an outer surface Shore C hardness within a range having a lower limit of 70 or greater, or 75 or greater, or 80 or greater, or 85 or greater, or 89 or greater, or an outer surface Shore C hardness within a range having a lower limit of 70 or 75 or 80 or 85 or 89 and an upper limit of 80 or 85 or 90 or 93 or 95, wherein the upper limit is greater than the lower limit (e.g., when the lower limit is 85, the upper limit is 90, 93, or 95). In another particular aspect of this embodiment, the core has an overall dual core compression within a range having a lower limit of 60 or 70 or 80 or 85 and an upper limit of 85 or 90 or 95.

Golf ball covers of the present invention include single, dual, and multilayer covers, and preferably have an overall thickness within the range having a lower limit of 0.03 inches or 0.04 inches or 0.045 inches or 0.05 inches or 0.06 inches and an upper limit of 0.07 inches or 0.08 inches or 0.09 inches or 0.10 inches. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.020 or 0.025 or 0.030 or 0.035 inches and an upper limit of 0.035 or 0.040 or 0.045 or 0.050 or 0.100 inches, and the outer cover having a thickness within a range having a lower limit of 0.020 or 0.025 or 0.030 inches and an upper limit of 0.035 or 0.040 or 0.045 inches.

The present invention is not limited by any particular dimple pattern, dimple plan shape, dimple cross-sectional profile, or dimple size. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos. 6,849,007 and 7,422,529, the entire disclosures of which are hereby incorporated herein by reference. In a particular embodiment, the dimple pattern is based on a spherically tiled tetrahedron. The dimples may have a variety of shapes and sizes including different depths and perimeters. In particular, the dimples may be concave hemispheres, or they may be triangular, square, hexagonal, catenary, polygonal or any other shape known to those skilled in the art. They may also have a cross-sectional profile based on any known dimple profile shape including, but not limited to, parabolic curves, ellipses, spherical curves, saucer-shapes, sine curves, truncated cones, flattened trapezoids, and catenary curves.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

In a particular embodiment, the present invention is directed to a golf ball comprising an inner core layer formed from a diene rubber composition and having a diameter of from 0.950 inches to 1.015 inches, a compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5, an outer core layer formed from a diene rubber composition and having a thickness of from 0.250 inches to 0.300 inches, and an outer surface Shore C hardness of from 85 to 95; an inner cover layer formed from an ionomer composition and having a thickness of from 0.030 inches to 0.040 inches, and an outer surface Shore C hardness of 93 or greater; and an outer cover layer formed from a polyurethane, polyurea, or polyurethane/urea composition, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat. One or more of the outer cover layer, primer coat, and topcoat is formed from a polyurethane/urea composition of the present invention.

In another particular embodiment, the present invention is directed to a golf ball comprising a solid, single-layer core formed from a diene rubber composition and having a diameter of from 1.510 inches to 1.530 inches, a compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8; an inner cover layer formed from an ionomer composition and having a thickness of from 0.040 inches to 0.050 inches, and an outer surface Shore C hardness of 93 or greater; and an outer cover layer formed from a polyurethane, polyurea, or polyurethane/urea composition, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat. One or more of the outer cover layer, primer coat, and topcoat is formed from a polyurethane/urea composition of the present invention.

For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

EXAMPLES

It should be understood that the examples below are for illustrative purposes only. In no manner is the present invention limited to the specific disclosures therein.

Polyurethane cover compositions were made with a 4,4'-MDI/PTMEG prepolymer at 6.5% NCO and cured with a blend of Ethacure® 300 curative, commercially available from Albemarle Corporation, and PolyOne® 10ET103 white pigment paste, available from PolyOne Corporation. The level of $TiO_2$ in each example is 2.0 wt %, based on the total weight of the final composition. Benzotriazole UV absorber (UVA) having the structure

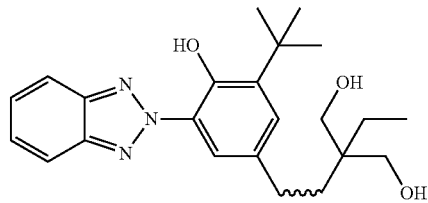 [SMILES: CCC(CO)(CO)CCc1cc(-n2nc3ccccc3n2)c(O)c(C(C)(C)C)c1]

was blended into the prepolymer at 3.7 wt %, 4.8 wt %, and 5.9 wt %, resulting in 3%, 4%, and 5%, respectively, in the final polymer. Because the UV absorber is reactive with the prepolymer, the resulting prepolymers were 5.6% NCO, 5.2% NCO, and 4.9% NCO, respectively. Material hardness was measured according to ASTM D2240 on the obverse and reverse side of two buttons formed of each composition, and the average of the results for each composition is given in Table 1 below.

Covers having a thickness of about 0.350 inches were formed by casting each composition about a cased core, i.e., a solid rubber core and an ionomer casing. The yellowness index (YI), lightness value (L*), red/green value (a*), yellow/blue value (b*), chroma (C*), and hue angle (h°) of each cover was calculated according to ASTM-E 313-73 using measurements taken on an X-Rite ColorEye® 7000A spectrophotometer, and the results are given in Table 1 below.

TABLE 1

| Composition 1 0 wt % UVA | YI | L* | a | b | C* | h° |
| --- | --- | --- | --- | --- | --- | --- |
| initial | 15.81 | 95.15 | −1.40 | 4.83 | 5.03 | 106.22 |
| 2.5 min | 37.85 | 89.54 | −0.51 | 21.65 | 21.66 | 91.36 |
| 5 min | 45.50 | 87.34 | −1.42 | 27.92 | 27.96 | 92.91 |
| 10 min | 45.89 | 85.92 | 0.43 | 27.90 | 27.90 | 89.12 |
| 20 min | 52.05 | 82.48 | 2.25 | 32.59 | 32.67 | 86.05 |
| 30 min | 54.61 | 79.03 | 3.90 | 33.85 | 34.07 | 83.42 |
| Composition 2 3 wt % UVA 70.8 Shore C 49.8 Shore C | YI | L* | a | b | C* | h° |
| initial | 15.24 | 94.68 | −1.91 | 4.39 | 4.78 | 113.50 |
| 2.5 min | 21.75 | 93.26 | −1.85 | 9.17 | 9.35 | 101.41 |
| 5 min | 24.54 | 91.32 | −1.64 | 11.13 | 11.25 | 98.41 |

TABLE 1-continued

| | | | | | | |
|---|---|---|---|---|---|---|
| 10 min | 28.63 | 91.74 | −1.99 | 14.38 | 14.52 | 97.87 |
| 20 min | 33.18 | 90.12 | −1.77 | 17.83 | 17.92 | 95.67 |
| 30 min | 38.17 | 89.12 | −1.08 | 21.84 | 21.87 | 92.83 |
| Composition 3 4 wt % UVA 69.9 Shore C 49.0 Shore D | YI | L* | a | b | C* | h° |
| initial | 15.73 | 94.92 | −1.97 | 4.76 | 5.15 | 112.52 |
| 2.5 min | 20.46 | 93.85 | −1.91 | 8.23 | 8.45 | 103.06 |
| 5 min | 24.00 | 93.48 | −2.04 | 10.92 | 11.11 | 100.58 |
| 10 min | 26.56 | 92.17 | −2.22 | 12.79 | 12.98 | 99.83 |
| 20 min | 30.26 | 31.11 | −2.24 | 15.61 | 15.77 | 98.17 |
| 30 min | 33.48 | 90.10 | −1.86 | 18.08 | 18.17 | 95.86 |
| Composition 4 5 wt % UVA 69.2 Shore C 48.4 Shore D | YI | L* | a | b | C* | h° |
| initial | 16.61 | 95.16 | −2.08 | 5.42 | 5.81 | 111.00 |
| 2.5 min | 18.16 | 93.80 | −2.13 | 6.50 | 6.84 | 108.13 |
| 5 min | 21.43 | 93.64 | −2.36 | 8.96 | 9.27 | 104.78 |
| 10 min | 24.75 | 92.90 | −2.59 | 11.45 | 11.74 | 102.77 |
| 20 min | 27.47 | 91.66 | −2.71 | 13.44 | 13.71 | 101.38 |
| 30 min | 31.60 | 91.36 | −2.42 | 16.73 | 16.91 | 98.24 |

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising at least one layer formed from a polyurethane/urea composition, wherein the composition comprises a reaction product of a polyisocyanate prepolymer, a reactive benzotriazole ultraviolet light absorber, and a chain extender, and wherein the reactive benzotriazole ultraviolet light absorber has the following structure:

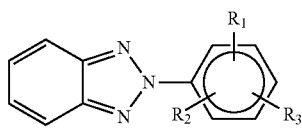

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; and $R_3$ is a hydrocarbon moiety having at least two reactive functional end group selected from hydroxyls, amines, thiols, vinyl, and epoxides.

2. The golf ball of claim 1, wherein the reactive benzotriazole ultraviolet light absorber is present in an amount of from 0.5 wt % to 7 wt %, based on the total weight of the polyurethane/urea composition.

3. The golf ball of claim 1, wherein the hydrocarbon moiety of $R_3$ has two hydroxyl end groups.

4. The golf ball of claim 3, wherein the reactive benzotriazole ultraviolet light absorber has the following structure:

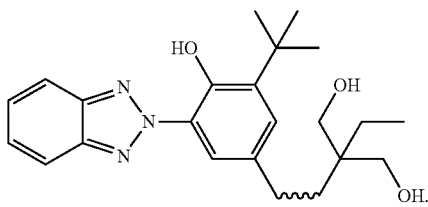 [SMILES: CCC(CO)(CO)CCc1cc(-n2nc3ccccc3n2)c(O)c(C(C)(C)C)c1]

5. The golf ball of claim 1, wherein the golf ball comprises an inner core layer, an outer cover layer, and a coating layer, and wherein the outer cover layer is formed from the polyurethane/urea composition.

6. The golf ball of claim 1, wherein the golf ball comprises an inner core layer, an outer cover layer, and one or more coating layers, and wherein at least one of the coating layers is formed from the polyurethane/urea composition.

7. The golf ball of claim 6, wherein at least one of the coating layers formed from the polyurethane/urea composition is a pigmented solvent-borne primer coat.

8. A golf ball comprising an inner core layer, an outer cover layer, and one or more coating layers,
wherein the outer cover layer is formed from a first polyurethane/urea composition comprising a reaction product of a first polyurethane/urea prepolymer, a first reactive benzotriazole ultraviolet light absorber, and a first chain extender, the first reactive benzotriazole ultraviolet light absorber having the following structure:

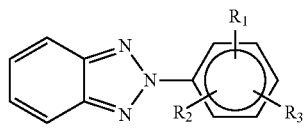

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; and $R_3$ is a hydrocarbon moiety having at least two reactive functional end group selected from hydroxyls, amines, thiols, vinyl, and epoxides; and
wherein at least one of the coating layers is formed from a second polyurethane/urea composition comprising a reaction product of a second polyurethane/urea prepolymer, a second reactive benzotriazole ultraviolet light absorber, and a second chain extender, the second reactive benzotriazole ultraviolet light absorber having the following structure:

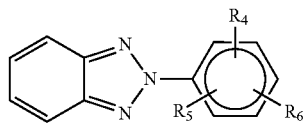

wherein $R_4$ is OH; $R_5$ is alkyl, hydroxyalkyl, acryloxyalkyl, (hydroxyphenyl)alkyl, (alkylester)alkyl, (hydroxyalkylether)oxoalkyl, phenylalkyl; and $R_6$ is a hydrocarbon moiety having at least one reactive functional end group selected from hydroxyls, amines, thiols, vinyl, and epoxides.

9. The golf ball of claim 8, wherein the first reactive benzotriazole ultraviolet light absorber is present in the first polyurethane/urea composition in an amount of from 0.5 wt % to 7 wt %, based on the total weight of the first polyurethane/urea composition, and the second benzotriazole ultraviolet light absorber is present in the second polyurethane/urea composition in an amount of from 0.5 wt % to 7 wt %, based on the total weight of the second polyurethane/urea composition.

10. The golf ball of claim 8, wherein the hydrocarbon moiety of $R_6$ has two hydroxyl end groups.

11. The golf ball of claim 8, wherein at least one of the coating layers formed from the polyurethane/urea composition is a pigmented solvent-borne primer coat.

12. The golf ball of claim 8, wherein at least one of the coating layers formed from the polyurethane/urea composition is a solvent-borne top coat.

13. The golf ball of claim 8, wherein the first reactive benzotriazole ultraviolet light absorber has the following structure:

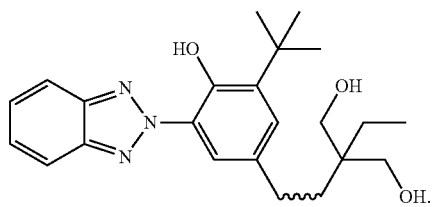 [SMILES: CCC(CO)(CO)CCc1cc(-n2nc3ccccc3n2)c(O)c(C(C)(C)C)c1]

14. The golf ball of claim 13, wherein the second reactive benzotriazole ultraviolet light absorber has the following structure:

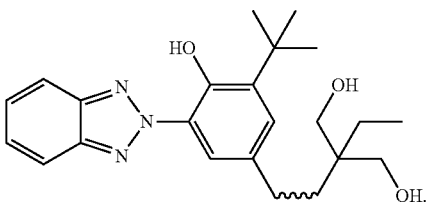 [SMILES: CCC(CO)(CO)CCc1cc(-n2nc3ccccc3n2)c(O)c(C(C)(C)C)c1]

15. The golf ball of claim 8, wherein the second reactive benzotriazole ultraviolet light absorber has the following structure:

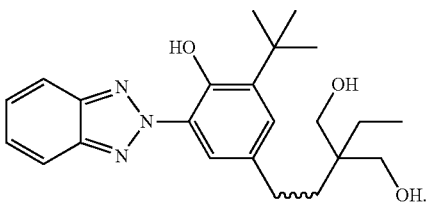 [SMILES: CCC(CO)(CO)CCc1cc(-n2nc3ccccc3n2)c(O)c(C(C)(C)C)c1]

* * * * *